Jan. 20, 1959 A. B. WINTERS ET AL 2,869,690
LIGHT POLE CONSTRUCTION
Filed Dec. 23, 1954 2 Sheets-Sheet 1

Inventors
Alva B. Winters
Donald K. Holst
Soans, Glaister & Anderson
Attorneys

Jan. 20, 1959  A. B. WINTERS ET AL  2,869,690
LIGHT POLE CONSTRUCTION
Filed Dec. 23, 1954  2 Sheets-Sheet 2

Inventors
Alva B. Winters
Donald K. Holst
Soans, Glaister & Anderson
Attorneys

United States Patent Office 2,869,690
Patented Jan. 20, 1959

2,869,690

LIGHT POLE CONSTRUCTION

Alva B. Winters, Golf, and Donald K. Holst, Chicago, Ill., assignors to Revere Electric Manufacturing Company, Chicago, Ill., a corporation of Illinois Application December 23, 1954, Serial No. 477,371

1 Claim. (Cl. 189—28)

This invention relates to improvements in light poles and is of particular value in connection with the construction and installation of poles supporting electric luminaires which are used for flood-lighting outdoor areas such as service stations or parking lots.

These luminaires, being generally of high lighting power, are often preferably located at a considerable height, for example 20-30 feet, above ground level. This requires a very sturdy construction, generally of metal throughout, and frequently a two-part design which includes a lower shaft or column portion and an upper extension or staff portion.

In many cases in order to facilitate servicing of the luminaire at the top of the pole, the upper section of the pole is placed on a hinge so that the luminaire may be swung downwardly into a convenient position for servicing at ground level without the necessity of climbing an extensible ladder or the use of other special equipment with resulting hazards entailed in the servicing operation.

Because of the foregoing, the total weight of the pole structure, in the case of a rather high luminaire, often is as much as between 200 and 300 pounds. Frequently one or more utility pipes are installed in the footing, usually of concrete, or on the concrete island if the pole is located at a filling station. For example, out of the footing or base to which the pole is secured there usually extends a service pipe or conduit which is permanently installed in the footing or island and contains the electric wire or cables through which electric current is supplied to the luminaire. Also, in the case of floodlighting poles located on the pump island, certain other utilities such as water or pressure air are supplied through pipes extending up out of the footing or island and to which the supply hoses are connected through suitable controlling valves.

The air and water pipes which are permanently installed in the footings generally extend above the surface of the footing about a foot or so, and the electric service pipe or conduit may extend above the footing as high as 4 feet or so, depending upon the safety standards in effect at that particular location.

Since one or more of the service pipes generally have to be connected up to service fittings which extend outside of the shaft, it has often been the custom to locate a hole in the side of the shaft so as to give access to the service pipes after the shaft has been bolted or otherwise fastened to its footing. Then, after the connections have all been made, the access hole is closed with a suitable cover.

When installing a light pole in this manner no serious problem is presented in the case of a small pole which is relatively light and can be raised by the two men of the installing team to a sufficient distance to be dropped over the service pipes. However, in the absence of additional help or special lifting equipment such as derricks, and where the pole is high, large and heavy, this method of installation involves extra men, great effort, and considerable accident hazard, even where the pole has to be raised as much as 12 inches above the footing so that it can be lowered over the pipes. It is difficult, in any case, for the installation to be made by two men unassisted, and the task becomes virtually impossible if the electric service pipe or conduit extends up to a height of about 4 feet above the ground level.

The principal object of my invention is to enable electric light poles of the class described to be installed by the usual work crew of not more than two or three persons without special equipment and without the expenditure of backbreaking efforts and without the risk of accident, in the case of poles weighing as much as 300 pounds, and where the utility pipes may extend upwardly from the footing a distance of from 1 to 4 feet and, in general, to provide an improved electric light pole construction which shall be efficient, durable and economical to construct, install and maintain.

In the drawings accompanying this application:

Figure 5 is a section taken on the line 5—5 of Figure 3; and

Figure 2:
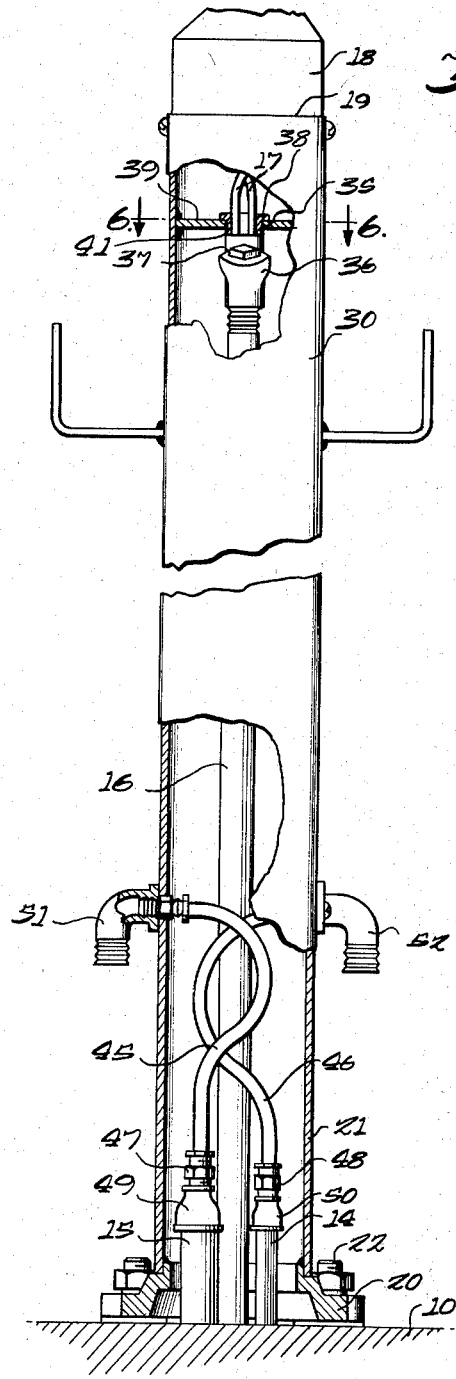
Figure 2 is a side elevation, partly in section, of the lower portion or shaft of the light pole structure disclosed in Figure 1.
Figure 3:
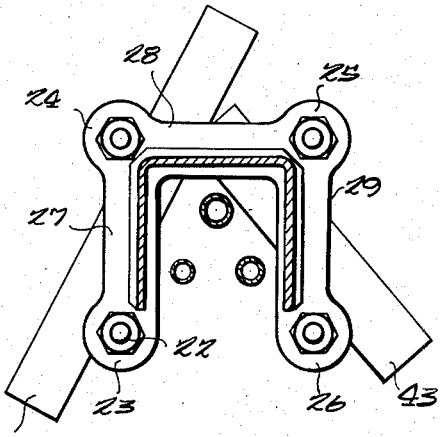
Figure 6:
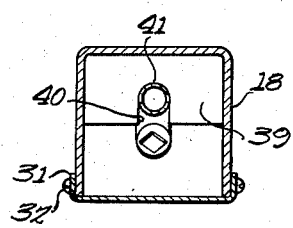
Figure 6 is a section taken on the line 6—6 of Figure 2.

Referring to the drawings, it will be seen that the pole structure is located upon a concrete footing or slab 10, the upper surface of which is a few inches above the surface of the surrounding ground or area, or it may be a part of the pump island of the filling station. In the particular example shown, the pole structure accommodates facilities for delivering water, air under pressure, as well as electricity for the luminaire, so that three pipes for these respective purposes are installed permanently in the footing and extend upwardly into the hollow shaft 11 of the structure. To the upper end of the shaft there is fitted an upstanding staff portion 12 supporting a luminaire 13 which may be of any desired type. The air is supplied through the pipe 14, water through the pipe 15, and the pipe or conduit 16 accommodates the electric wires 17 which in the present instance emerge from the top of the service conduit 16 at a point about 4 feet above ground level as shown best in Fig. 2. The pipes 14 and 15 extend upwardly from the footing 10 a distance of about a foot.

The shaft 11 in the present instance is of hollow metal construction. Its upper end is in the form of a hollow square tube 18 while the lower portion thereof is of channel shape construction as shown best in Fig. 5. The channel extends from the circumferentially continuous portion 18 of the shaft which ends at the line 19 (see Fig. 2) clear down to the bottom of the shaft and through the collar 20 which is welded to the bottom of the channel portion 21 of the shaft. The shaft is secured to the footing 10 by means of four anchor bolts 22 extending through holes in the lugs 23, 24, 25 and 26 of the shaft collar. These lugs are connected together by the webs or yokes 27, 28 and 29 along three sides of the collar but at the front side there is no connecting yoke or web so that the space between the lugs 23 and 26 forms, in effect, a continuation of the open side of the channel which extends down the side of the shaft. Hence, the open side of the channel in the shaft is unobstructed for a distance extending up from the footing 10 to a point 19 which is above the upper end of the electric conduit 16.

After the installation of the shaft structure has been effected, and after the various utility connections have been made, the open side of the channel is closed by a cover plate 30 extending the entire length of the channel and having flanges 31 fitting over the front edges of the channel-shaped structure and secured thereto by screws as indicated at 32.

In view of the fact that the lower portion of the shaft is not a continuous tube but is U-shaped in horizontal cross-section, in certain cases it may be advisable to reenforce the same by using a thicker wall than might otherwise be employed.

Figure 1:
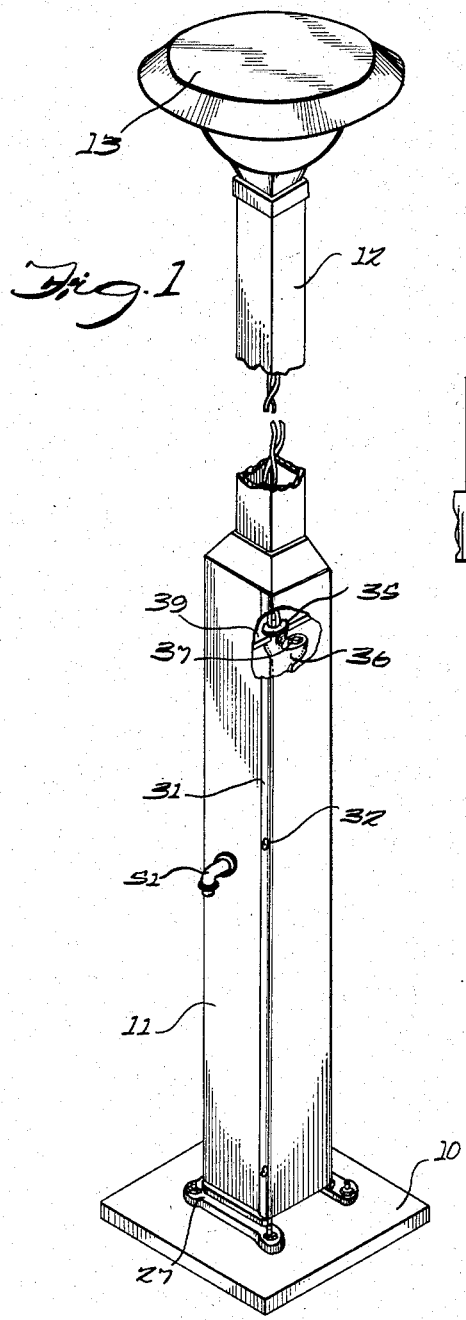
Figure 1 is a perspective elevation of an electric light-supporting pole or standard adapted for installation upon a pump island of a gasoline filling station and equipped with water and air facilities in addition to the electric luminaires.

Referring now to the electrical conduit 16, it will be seen that to the top of this conduit there is screwed a species of pothead 35 (see Figs. 1 and 2) shaped in the form of a Y, one limb of the Y being in line with the pipe 16 while the offset limb is placed at an angle as indicated at 36. The offset or branch 36 from the fitting 35 is closed by a screw plug 37. The purpose of this special pothead fitting is to allow the top of the electric service conduit to be sealed to prevent passage of gases or fluids. To this end, after the wires 17 have been drawn through the pipe 16, the bottom of the branch 36 of the pothead fitting is first packed with a little oakum or other suitable sealing material, then the heated pothead wax or other thermoplastic compound is poured into the open upper end of the branch 36 of the pothead. Upon cooling the compound creates a seal around the wires. The plug 37 is then screwed into the open end of the offset 36 above the sealing compound so as to complete the sealing operation.

In order to effect a proper grounding of the pole structure to prevent electric shocks, and also to prevent fires from developing through accidental short circuits, the standard is mechanically and electrically connected to the upper end of the conduit 16. This is done by first stringing the wires 17 through a bushing 38. This bushing is arranged to screw into the upper end of the Y-fitting 35 which is located about ⅛ of an inch below the rectangular horizontal filler plate 39 welded to the inside of the channel 21. The plate 39 on its front edge has a slot 40 which is wide enough to receive the body 41 of the bushing 38. After the installation of the wires and the sealing of the same, and after the shaft has been installed, the bushing 38 is screwed down into the fitting 35 so as to make a firm electrical connection with the plate 39.

Figure 3:
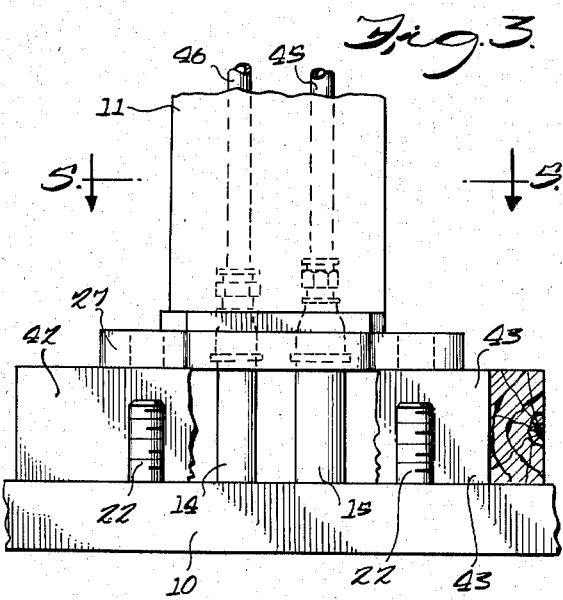
Figure 3 is a fragmentary elevation showing the position of the shaft in relation to the island and anchor bolts when the pole is being installed.
Figure 4:
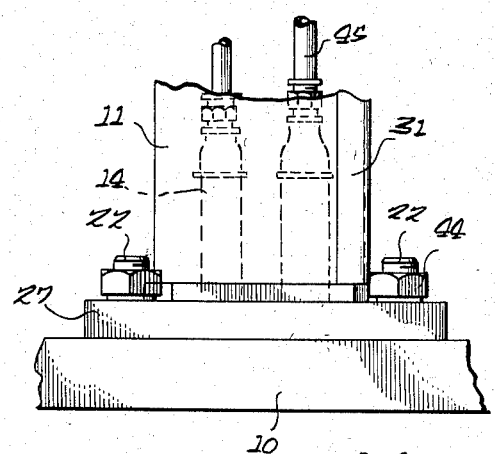
Figure 4 is a view similar to Figure 3 when the installation job is completed.

The foregoing description applies particularly to Figs. 1, 4, 2 and 6 which show the completed installation. Figs. 3 and 5 illustrate the manner in which the installation is effected. Referring to these figures, it will be observed that the cover plate 30 has first been removed from the shaft so that the channel in the shaft is completely open on one side thereof. The shaft with associated parts is then raised to upright position and placed upon two blocks of wood 42 and 43 which are of a height, when placed upon the footing 10 as shown in Fig. 3, such as to bring the top surfaces of the blocks slightly above the upper ends of the anchor bolts 22. The collar or shaft is then slid horizontally on the blocks into such position that the bolt holes in the lugs 23, 24, 25 and 26 register with the stems of the anchor bolts. Then the blocks are removed and the column is lowered into the position shown in Figs. 1, 2 and 4. Then the nuts 44 are applied and screwed down so as to firmly anchor the column to the footing 10.

If the water and air connections have not been installed they are then installed on the column. These preferably consist of lengths of copper tubing 45 and 46, the lower ends of which are equipped with suitable fittings 47 and 48 by which they may be connected to the reducers 49 and 50 on the upper ends of the pipes 15 and 14. The upper ends of the tubes 45 and 46 are similarly connected to the water fitting 51 and the pressure-air fitting 52.

In installing the electrical wiring for the luminaire, it is usually conventient to use a sufficient length of electric cable or conductors to extend from the switch junction box, or fuse panel (in the station) to the luminaire itself, so that a continuous wire may be used without the necessity of splicing the wire at the pole. To facilitate this it is found convenient to extend the shaft channel upwardly a short distance above the level of the fitting 35 at the top of pipe 16 so that at the time of installation the wires may be fished through the pipe 16 or through the upper end of the column, if the wires have already been installed in the conduit 16.

After all of the air, water and electrical connections have been completed, there is then no longer any occasion to have access to the interior of the shaft, and the cover plate 30 is applied and fastened in place by the screws 32. Upon removal of the cover plate at any time the utility pipes and connections may be inspected or disconnected to permit removal of the column for repair or replacement.

We claim:

The combination with a footing and service piping fixedly installed therein and extending upwardly at least one foot from the upper surface of the footing, of an electric lighting standard of substantial height comprising a tubular upper portion and an open-sided channel-shaped lower portion, said upper tubular portion being integral with and supported entirely by the channel-shaped lower portion, a U-shaped bolting flange secured to the lower end of said lower portion and attaching the standard to said footing and encompassing the service piping, said lower portion and flange adapting said standard for sideward movement in the erect position to encompass said piping, and a removable cover closing the open side of said lower portion to conceal said piping.

References Cited in the file of this patent

UNITED STATES PATENTS

| | | |
|---|---|---|
| 667,567 | Page | Feb. 5, 1901 |
| 686,816 | Macphail | Nov. 19, 1901 |
| 1,272,088 | Poole | July 9, 1918 |
| 1,322,442 | Holmes | Nov. 18, 1919 |
| 1,502,342 | Lucas | July 22, 1924 |
| 1,760,270 | Griswold | May 27, 1930 |
| 1,884,247 | Riemenschneider | Oct. 25, 1932 |
| 2,090,239 | Strang | Aug. 17, 1937 |
| 2,590,123 | Rapp | Mar. 25, 1952 |

FOREIGN PATENTS

| | | |
|---|---|---|
| 674,711 | Great Britain | June 25, 1952 |